(12) United States Patent
Kurokawa et al.

(10) Patent No.: US 11,454,768 B2
(45) Date of Patent: Sep. 27, 2022

(54) ASSEMBLY METHOD FOR COHERENT RECEIVER

(71) Applicants: Sumitomo Electric Industries, Ltd., Osaka (JP); Sumitomo Electric Device Innovations, Inc., Yokohama (JP)

(72) Inventors: Munetaka Kurokawa, Osaka (JP); Yasushi Fujimura, Osaka (JP); Ken Ashizawa, Yokohama (JP); Satoru Kanemaru, Yokohama (JP)

(73) Assignees: Sumitomo Electric Industries, Ltd., Osaka (JP); Sumitomo Electric Device Innovations, Inc., Yokohama (JP)

( * ) Notice: Subject to any disclaimer, the term of this patent is extended or adjusted under 35 U.S.C. 154(b) by 445 days.

(21) Appl. No.: 16/557,270

(22) Filed: Aug. 30, 2019

(65) Prior Publication Data
US 2020/0073063 A1  Mar. 5, 2020

(30) Foreign Application Priority Data

Aug. 31, 2018 (JP) .............................. JP2018-162444

(51) Int. Cl.
| | |
|---|---|
| H04B 10/06 | (2006.01) |
| G02B 6/42 | (2006.01) |
| G02B 27/28 | (2006.01) |
| H04B 10/61 | (2013.01) |
| G02B 19/00 | (2006.01) |

(52) U.S. Cl.
CPC ......... G02B 6/4213 (2013.01); G02B 19/009 (2013.01); G02B 27/283 (2013.01); H04B 10/614 (2013.01); H04B 10/615 (2013.01); G02B 6/4257 (2013.01); G02B 6/4295 (2013.01)

(58) Field of Classification Search
CPC .... H04B 10/614; H04B 10/61; H04B 10/671; H04B 10/672; H04B 10/674; H04B 10/615; H04B 10/40; H04B 10/6151; H04J 14/02; H04J 14/06; G02B 6/4246; G02B 6/4206; G02B 6/4213
USPC ....... 398/202, 204, 205, 206, 207, 208, 209, 398/212, 65, 152, 183, 184, 188, 135,
(Continued)

(56) References Cited

U.S. PATENT DOCUMENTS 7,873,282 B2 * 1/2011 Secondini .......... H04B 10/2569
398/147
8,861,979 B2 * 10/2014 Liu .................. H04B 10/25133
398/205
(Continued)

FOREIGN PATENT DOCUMENTS

JP        2015-084500 A        4/2015

*Primary Examiner* — Hanh Phan
(74) *Attorney, Agent, or Firm* — Baker Botts L.L.P.; Michael A. Sartori (57) ABSTRACT

A coherent receiver comprising: a signal port receiving the signal light that has two polarization components at right angles each other; a polarization dependent beam splitter (PBS) that splits the signal light into two portions depending on the polarizations contained in the signal light; a beam splitter (BS) that splits the local light into two portions; a multi-mode interference (MMI) device that interferes between one of the two portions of the signal light and one of the two portions of the local light; optical components provided between the PBS and the MMI device; and wherein the PBS splitting a first wavelength range of the signal light and a second wavelength range outside the first wavelength range.

8 Claims, 5 Drawing Sheets

(58) Field of Classification Search
USPC ...... 398/136, 158, 159, 162; 385/89, 90, 92, 385/93
See application file for complete search history.

(56) References Cited

U.S. PATENT DOCUMENTS

| | | | | |
|---|---|---|---|---|
| 2013/0177316 | A1* | 7/2013 | Cardakli | H04B 10/5167 398/79 |
| 2013/0343751 | A1* | 12/2013 | Mamyshev | H04B 10/61 398/38 |
| 2016/0119064 | A1* | 4/2016 | Yamaji | G02F 1/025 398/214 |

* cited by examiner

ASSEMBLY METHOD FOR COHERENT RECEIVER

TECHNICAL FIELD

The present disclosure relates to an assembly method for a coherent receiver.

BACKGROUND

Figure 5:
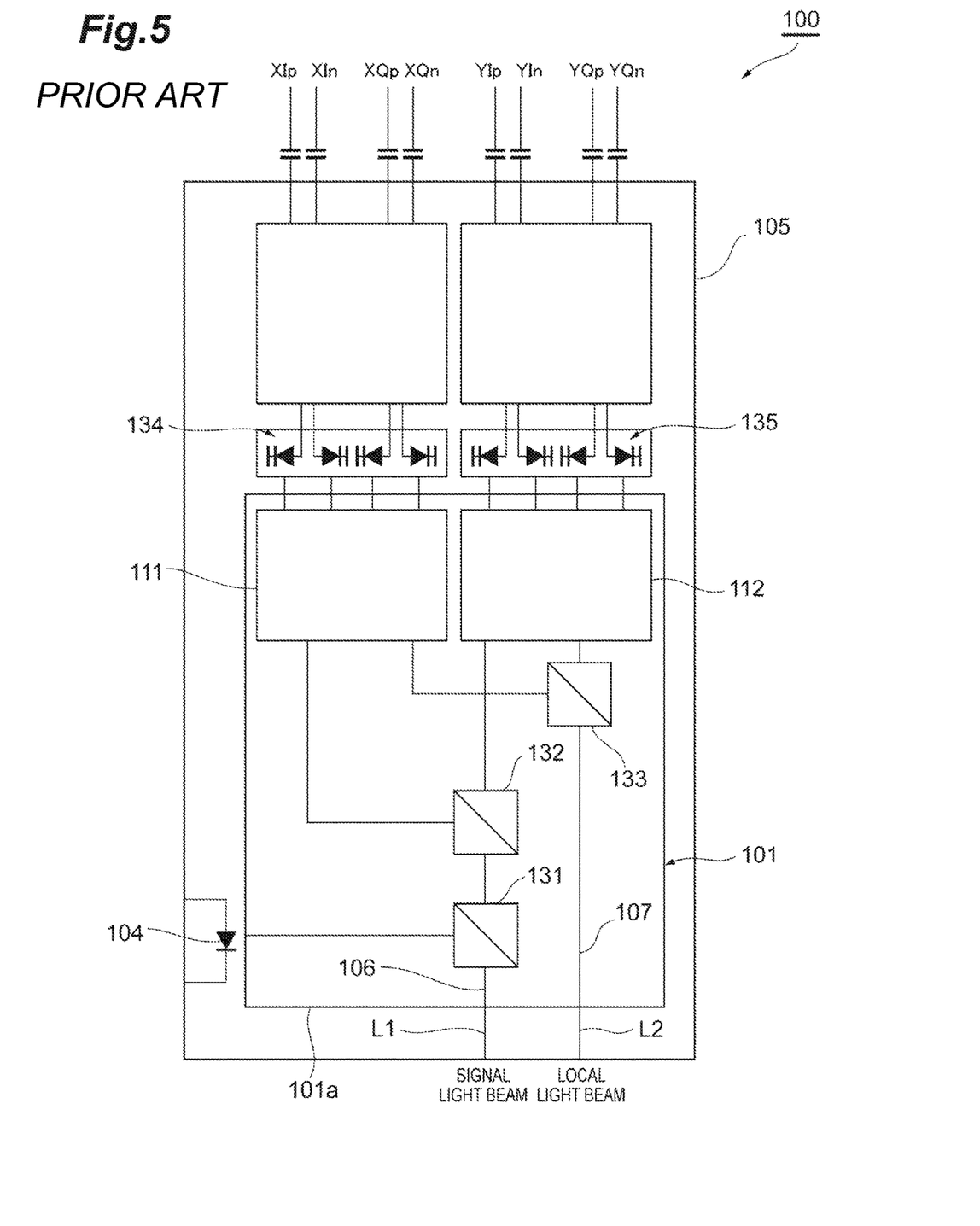
FIG. 5 schematically shows the configuration of a conventional coherent receiver.

Japanese Unexamined Patent Publication No. 2015-084500 discloses a technique relating to a coherent receiver. FIG. 5 schematically shows the configuration of the coherent receiver. In a coherent receiver 100 shown in FIG. 5, an optical waveguide substrate 101, optical 90-degree hybrid circuits 111 and 112, a plurality of signal light beam receiving devices 134 and 135, and a monitor light receiving device 104 are housed in a case 105. A signal light beam L1 and a local light beam L2 are inputted respectively to optical waveguides 106 and 107 in the optical waveguide substrate 101 from a first end face 101a of the optical waveguide substrate 101. The signal light beam L1 includes two polarized components orthogonal to each other.

The monitor light receiving device 104 receives one divided part of the signal light beam L1 divided by an optical divider element 131 on the optical waveguide 106. Another divided part of the signal light beam L1 is divided into polarized components by a polarization beam splitter 132. One of the divided polarized components is inputted to the optical 90-degree hybrid circuit 111, and the other of the polarized components is inputted to the optical 90-degree hybrid circuit 112. The local light beam L2 is divided by the optical divider element 133, and one divided part of the local light beam L2 is inputted to the optical 90-degree hybrid circuit 111. Another divided part of the local light beam L2 is inputted to the optical 90-degree hybrid circuit 112. The light intensities of the coherent light beams outputted from the optical 90-degree hybrid circuits 111 and 112 are detected by the plurality of signal light beam receiving devices 134 and 135.

SUMMARY

In the assembly method for a coherent receiver according to an embodiment, the coherent receiver includes a signal light beam input port configured to receive a signal light beam including two polarized components orthogonal to each other, a polarization beam splitter configured to divide the signal light beam into one of the polarized components and another of the polarized components, a signal receiving unit configured to generate a first reception signal that is electrical from the one polarized component and generate a second reception signal that is electrical from the other polarized component, and at least one optical component disposed on an optical path between the signal light beam input port and the signal receiving unit. The polarization beam splitter includes a first wave range that is the wave range of the signal light beam and a second wave range that is out of the first wave range in a designed wave range. The assembly method includes the steps of: disposing the polarization beam splitter on the optical path between the signal light beam input port and the signal receiving unit; disposing the at least one optical component on an optical path between the polarization beam splitter and the signal receiving unit; inputting a test light beam included in the second wave range that is different from the wavelength range of the signal light beam from the signal light beam input port to the polarization beam splitter; and adjusting an optical axis of the at least one optical component based on the light intensity of the test light beam inputted to the signal receiving unit.

DETAILED DESCRIPTION

At least a part of various optical components configuring the coherent receiver is designed suitable for a wave range to be used. For example, the polarization beam splitter 132 shown in FIG. 5 divides two polarized components through a dielectric multi-layer film, and the film thickness of the dielectric multi-layer film is designed suitable for a wave range to be used. However, in association with an increase in communication volumes nowadays, it is predicted that a wave range is extended. When a wave range is extended, one designed wave range fails to cope with such an increase, and the designed wave range of the optical component has to be varied corresponding to the wave range of the coherent receiver to be used.

In the assembly of a coherent receiver, the optical axes of various optical components are adjusted using a test light beam. The wavelength of the test light beam used at this time is desirably included in the designed wave range of the optical component in order to highly accurately perform optical axis adjustment. However, in the case in which the designed wave range of the optical component is varied corresponding to the wave range to be used, the wavelength of the test light beam has to be changed corresponding to the coherent receiver to be used. Therefore, the wavelength tunable range of the light source of a testing device has to be extended (or the light source has to be replaced for each coherent receiver), resulting in an increase in the cost of the testing device. The assembly work of the coherent receiver is complicated.

The present disclosure is to provide an assembly method for a coherent receiver that can reduce an increase in the cost of a testing device and the complication of the assembly work of a coherent receiver even the case in which a wave range is extended.

In accordance with the assembly method for a coherent receiver according to the present disclosure, an increase in the cost of a testing device and the complication of the assembly work of a coherent receiver can be reduced even the case in which the wave range is extended.

[Description of an Embodiment of the Present Disclosure]

First, the content of an embodiment of the present disclosure will be described in list. In an assembly method for a coherent receiver according to an embodiment, the coherent receiver includes a signal light beam input port configured to receive a signal light beam including two polarized components orthogonal to each other, a polarization beam splitter configured to divide the signal light beam into one of the polarized components and another of the polarized components, a signal receiving unit configured to generate a first reception signal that is electrical from the one polarized component and generate a second reception signal that is electrical from the other polarized component, and at least one optical component disposed on an optical path between the signal light beam input port and the signal receiving unit. The polarization beam splitter includes a first wave range that is the wave range of the signal light beam and a second wave range that is out of the first wave range in a designed wave range. The assembly method includes the steps of: disposing the polarization beam splitter on the optical path between the signal light beam input port and the signal receiving unit, disposing the at least one optical component on an optical path between the polarization beam splitter and the signal receiving unit, inputting a test light beam included in the second wave range that is different from the wavelength range of the signal light beam from the signal light beam input port to the polarization beam splitter, and adjusting an optical axis of the at least one optical component based on the light intensity of the test light beam inputted to the signal receiving unit.

In the assembly method, the polarization beam splitter includes the first wave range that is the wave range of the signal light beam and the second wave range that is out of the first wave range in the designed wave. Thus, the wavelength of the test light beam can be set in the second wave range out of the wave range of the signal light beam. In the assembly method, after the polarization beam splitter is disposed, the optical axis of another optical component is adjusted using the test light beam included in the second wave range. Therefore, according to the assembly method, even in the case in which the wave range is extended from the second wave range to the first wave range, the optical axis of the optical component of the coherent receiver for the first wave range and the optical axis of the optical component of the coherent receiver for the second wave range can be adjusted using the test light beam at a common wavelength. Accordingly, the extension of the wavelength tunable range of the light source of a testing device (or the replacement of the light source for each coherent receiver) can be eliminated, and hence an increase in the cost of a testing device and the complication of the assembly work of a coherent receiver can be reduced.

In the above-described assembly methods, the lower limit of the first wave range is 1,565 nm, and the second wave range may include a wave range smaller than 1,565 nm. Presently, in a coherent light transmission system, a wave range of 1,530 nm to 1,565 nm (a so-called C-band) is used. However, in order to meet a further increase in communication volumes in future, the combined use of the wave range of 1,565 nm to 1,615 nm that is a long wavelength band (a so-called L-band) with the C-band is studied. Therefore, in the above-described assembly methods, the lower limit of the first wave range is 1,565 nm (i.e., the L-band), the second wave range includes a wave range smaller than 1,565 nm (i.e., the C-band), and hence even in the case of the combined use of the L-band and the C-band, the optical axis of the optical component of the coherent receiver for the L-band can be highly accurately adjusted using the test light beam included in the C-band. In this case, the upper limit of the second wave range may be 1,615 nm (i.e., the upper limit of the L-band). In this case, the wavelength of the test light beam may be in the range of 1,550 nm to 1,565 nm.

In the above-described assembly methods, the at least one optical component may include a lens configured to collect the signal light beam to the signal receiving unit. Thus, the optical axis of the lens can be highly accurately adjusted. In the above-described assembly methods, the at least one optical component may include a variable attenuator configured to attenuate the signal light beam. Thus, the attenuation ratio of the variable attenuator can be highly accurately adjusted.

[Detail of the Embodiment of the Present Disclosure]

In the following, specific examples of an assembly method for a coherent receiver according to an embodiment of the present disclosure will be described with reference to the drawings. Note that the present application is not limited to the examples below, and aims to include all modifications in the scope equivalent to claims. In the following description, the same or corresponding components are designated with the same reference signs in the drawings, and the duplicate description is appropriately omitted.

Figure 1:
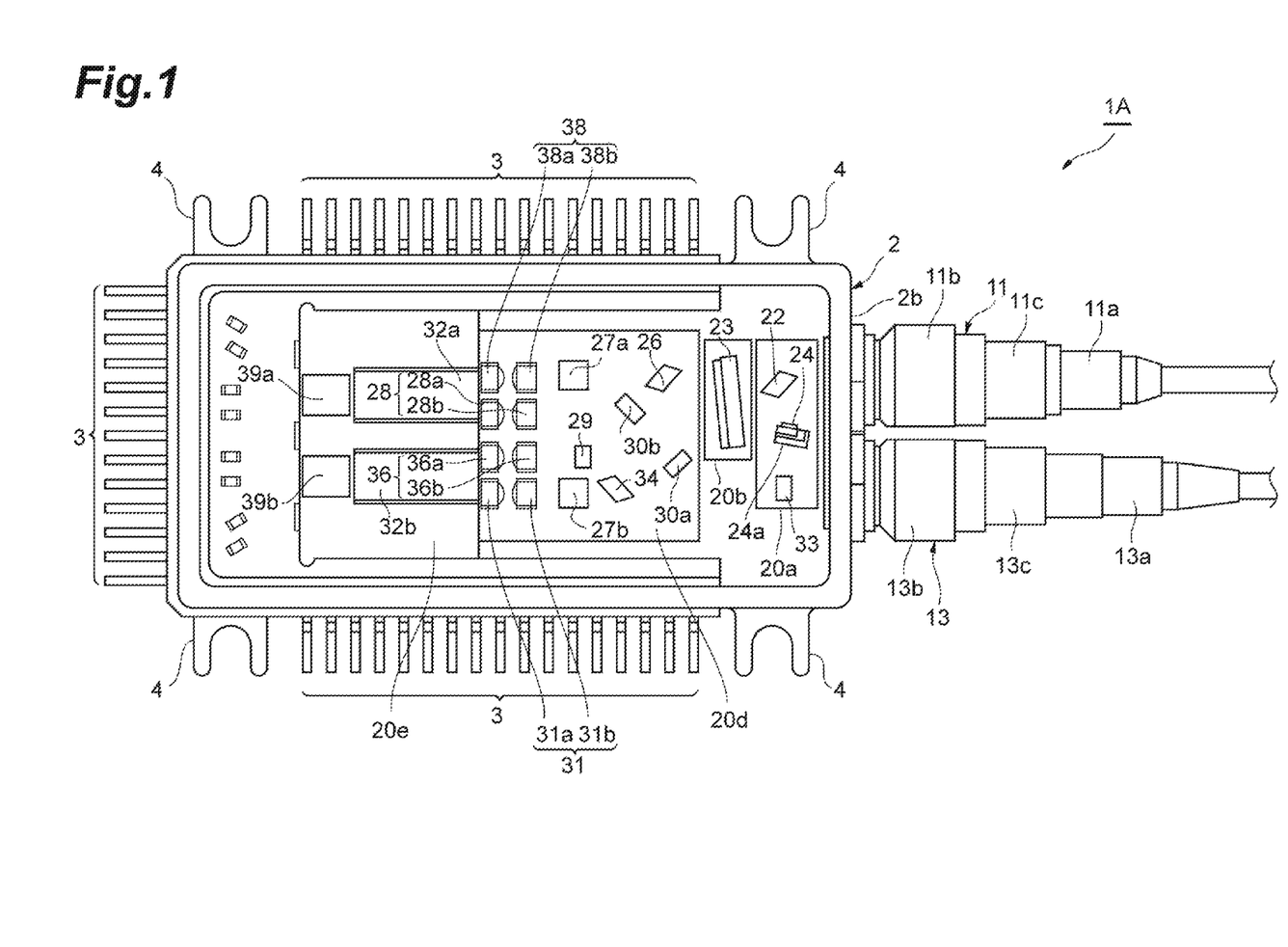
FIG. 1 is a plan view showing a coherent receiver that is a target of an assembly method according to an embodiment.
Figure 2:
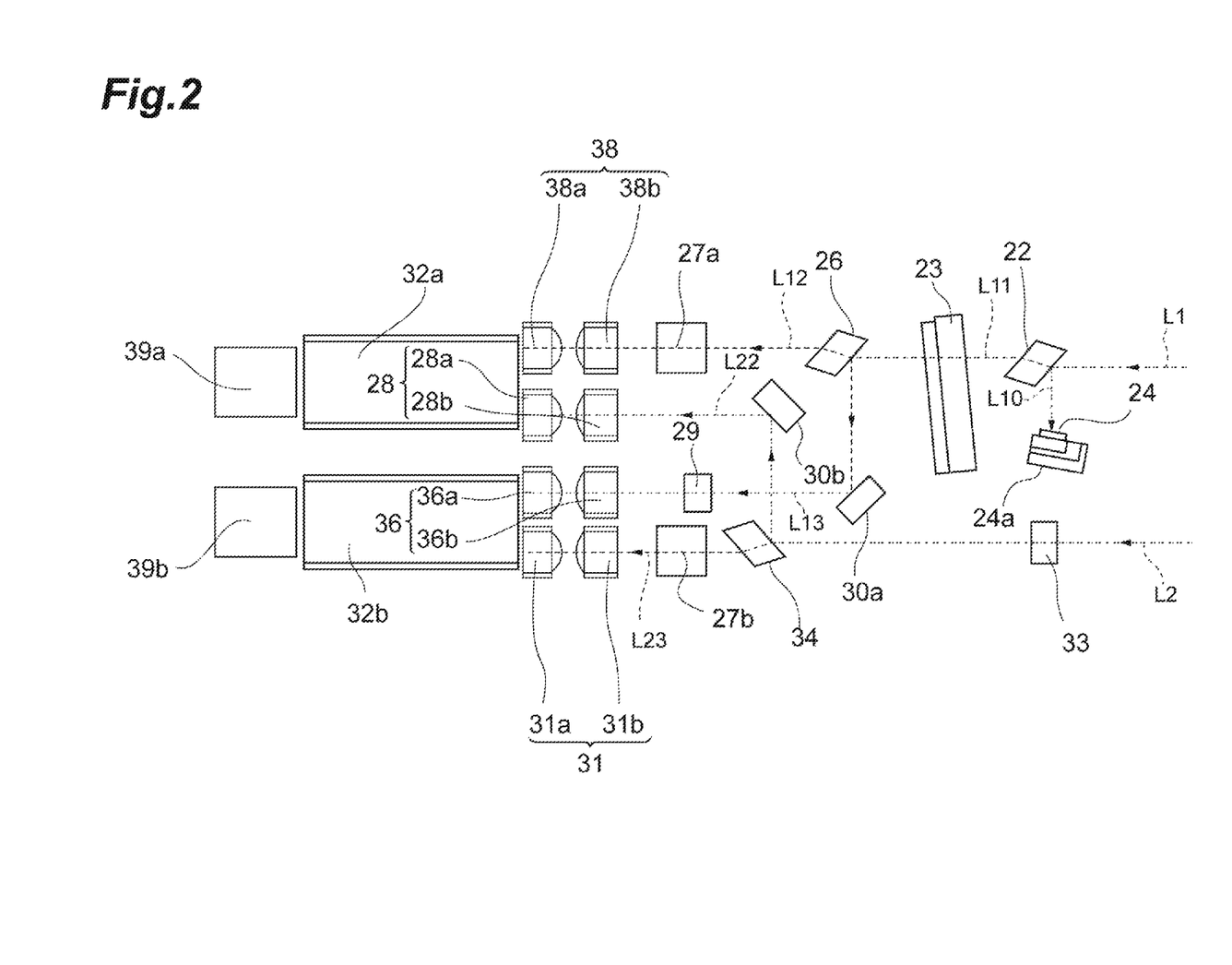
FIG. 2 is a plan view schematically showing the connection relationship between optical components in the inside of the coherent receiver.

FIG. 1 is a plan view showing a coherent receiver 1A that is a target of an assembly method according to an embodiment of the present disclosure. FIG. 2 is a plan view schematically showing the connection relationship between optical components in the inside of the coherent receiver 1A. The coherent receiver 1A causes interference between a phase modulated reception signal light (in the following, referred to as a signal light beam) L1 and a local oscillation light (in the following, referred to as a local light beam) L2, and extracts information included in the signal light beam L1. Note that in the embodiment, the signal light beam L1 includes two polarized components having polarization directions orthogonal to each other and phase components orthogonal to each other, i.e., information phase modulated between angles of 0° and 180° and information phase modulated between angles of 90° and 270°, which is a signal modulated by so-called DP-QPSK (Dual Polarization Quadrature Phase Shift Keying), and the coherent receiver 1A targets the modulated signal. Note that the local light beam L2 mainly includes one of these polarized components that is typically a linearly polarized light beam.

As shown in FIG. 1, the coherent receiver 1A includes a housing (a case) 2 in a nearly rectangular cuboid shape and a signal light beam input port 11 (signal port) and a local light beam input port 13 fixed to one end face 2b of the housing 2. The optical axis of the signal light beam input port 11 and the optical axis of the local light beam input port 13 are in parallel with each other. The signal light beam input port 11 is connected to a single mode fiber (SMF) from the outside of the coherent receiver 1A, and receives the signal light beam L1 through the SMF. The local light beam input port 13 is connected to a polarization maintaining fiber (PMF), and receives the local light beam L2 from the outside of the coherent receiver 1A through the PMF. The signal light beam L1 and the local light beam L2 are inputted to the inside of the housing 2 respectively through the signal light beam input port 11 and the local light beam input port 13. Note that a light source for the local light beam L2 is a semiconductor laser diode (LD), for example.

The signal light beam input port 11 integrally includes a sleeve 11a in a cylindrical shape receiving a ferrule attached to the tip end of the SMF, a lens holder 11b housing a collimating lens, and a core holder 11c disposed between the sleeve 11a and the lens holder 11b. The lens holder 11b is fixed to the one end face 2b of the housing 2. The signal light beam L1 having propagated through the inside of the SMF is converted into a collimated light beam at the collimating lens, and is entered to the housing 2. The local light beam input port 13 integrally includes a sleeve 13a in a cylindrical shape receiving a ferrule attached to the tip end of the PMF, a lens holder 13b housing a collimating lens, and a core holder 13c disposed between the sleeve 13a and the lens holder 13b. The lens holder 13b is fixed to the one end face 2b of the housing 2. The local light beam L2 having propagated through the inside of the PMF is converted into a collimated light beam at the collimating lens, and is entered to the housing 2.

The housing 2 is made of Kovar. In the four side surfaces of the housing 2, a plurality of terminals 3 is provided on the other side surfaces except the one end face 2b. The plurality of terminals 3 is drawn from the lowermost layer of multi-layered ceramics configuring the side surfaces. The plurality of terminals 3 includes terminals configured to extract reception signals extracted from the signal light beam L1 to the outside of the coherent receiver 1A, terminals configured to supply a power supply voltage or bias to electronic circuits in the inside of the housing 2, ground terminals, and any other terminals. From four corners of the bottom face of the housing 2, a flange 4 configured to fix the housing 2 to a circuit board, for example, is drawn.

In addition to the above-described configurations, the coherent receiver 1A includes a first MMI element 32a (MMI device) and a second MMI element 32b (MMI device) that are multi-mode interference waveguide (MMI) elements configured to cause interference between the signal light beam L1 and the local light beam L2. The MMI element 32a causes interference between one of the polarized components of the signal light beam L1 and the local light beam L2 to restore information included in the one polarized component. The MMI element 32b causes interference between another of the polarized components of the signal light beam L1 and the local light beam L2 to restore information included in the other polarized component. The MMI elements 32a and 32b are optical 90-degree hybrid elements, for example. The MMI elements 32a and 32b are disposed side by side to the one end face 2b.

The coherent receiver 1A further includes a plurality of optical components disposed on the optical path between the input ports 11 and 13 and the MMI elements 32a and 32b. In order to optically couple the signal light beam input ends of these two MMI elements 32a and 32b to the signal light beam input port 11, the plurality of optical components includes a polarization dependent beam splitter (PBS) 26, a skew adjustment element 27a, a lens system (a condensing component) 36, a retardation plate (a half wave plate) 29, a total reflection mirror 30a, and a lens system (a condensing component) 38. The plurality of optical components further includes a beam splitter (BS) 22 and a variable optical attenuator (VOA) 23 disposed on the optical path between the PBS 26 and the signal light beam input port 11.

These optical components disposed on the optical path between the signal light beam input port 11 and the MMI elements 32a and 32b are all housed in the inside of the housing 2. Specifically, as shown in FIG. 1, the BS 22 is installed on a carrier 20a provided on the bottom face of the housing 2. The VOA 23 is installed on a carrier 20b provided on the bottom face of the housing 2 separately from the carrier 20a. The other optical components are installed on a carrier 20d provided on the bottom face of the housing 2 separately from the carriers 20a and 20b. The carriers 20a, 20b, and 20d are made of AlN, for example.

The BS 22 can be configured of an optically transparent member in a flat shape having a front surface (an optical surface) and a back surface opposite to each other and a dielectric multi-layer film filter formed on the front surface. The reflectance of the dielectric multi-layer film filter is 10% or less, for example, in the wavelength of the signal light beam L1, and in the example, the reflectance is 5%. The signal light beam L1 is entered to the front surface of the BS 22, and divided by the dielectric multi-layer film filter. One signal light beam (a monitor light beam L10) that is divided is reflected off the dielectric multi-layer film filter. Another signal light beam L11 is transmitted through the dielectric multi-layer film filter, and emitted from the back surface of the BS 22. The optical axis of the incident signal light beam L1 and the optical axis of the reflected signal light beam L11 form a nearly right angle. Thus, the optical axis of the reflected signal light beam L11 is in parallel with the optical axis of the signal light beam input port 11.

The coherent receiver 1A further includes a monitor photodiode (a monitor PD) 24. As shown in FIG. 1, the monitor PD 24 is fixed to the side surface of a PD carrier 24a, and the PD carrier 24a is installed on the carrier 20a. As shown in FIG. 2, the monitor PD 24 is disposed on the front surface side of the BS 22. The monitor PD 24 is optically coupled to the surface of the BS 22, and receives the monitor light beam L10 reflected off the BS 22. The monitor PD 24 outputs a detection signal corresponding to the monitor light beam L10. The carrier 20a has a wiring pattern conveying the detection signal, and this wiring pattern is connected to the terminal 3 through a bonding wire.

The VOA 23 is disposed on the optical path of the signal light beam L11 transmitted through the BS 22, and attenuates the signal light beam L11 as necessary. The attenuated amount is set based on the detection signal outputted from the above-described monitor PD 24. The control signal that sets the attenuated amount is inputted from the outside of the coherent receiver 1A through the terminal 3. For example, in the case in which the monitor PD 24 detects an over input state, the attenuated amount of the VOA 23 is increased to decrease the intensity of the signal light beam L11 going to the MMI elements 32a and 32b.

The PBS 26 is a member in a flat shape, and has a light incident surface (an optical surface) optically coupled to the BS 22 through the VOA 23. The PBS 26 can be configured of an optically transparent member in a flat shape having a front surface (a light incident surface) and a back surface opposite to each other and a dielectric multi-layer film filter formed on the front surface. The dielectric multi-layer film filter is formed of a $Ta_2O_5$ layer and an $SiO_2$ layer alternately stacked, for example. The PBS 26 divides the signal light beam L11 into a signal light beam L12 having one of polarized components (e.g. an X-polarized component) and a signal light beam L13 having the other of the polarized components (e.g. a Y-polarized component) by the action of the dielectric multi-layer film filter. The ratio of division at this time is 50%. The signal light beam L12 is transmitted through the PBS 26. The signal light beam L13 is reflected off the light incident surface of the PBS 26, and travels in a straight line in the direction intersecting with the traveling direction of the signal light beam L12. The optical axis of the signal light beam L12 and the optical axis of the signal light beam L13 form a nearly right angle.

The skew adjustment element 27a and the lens system 38 are disposed on the optical path between the PBS 26 and the signal light beam input end of the MMI element 32a. The signal light beam L12 having travelled through the PBS 26 in a straight line is passed through the skew adjustment element 27a. The skew adjustment element 27a is an Si (Silicon) block material, for example, and compensates a delay due to the difference in the optical path length of the signal light beam L13 to the signal light beam L12 by equivalently increasing the optical path length from the PBS 26 to the signal light beam input end of the MMI element 32a. That is, the signal light beam L13 has a distance to the MMI element longer than a distance from the PBS 26 to the total reflection mirror 30a. The skew adjustment element 27a imparts the phase delay of the signal light beam L13 corresponding to the distance to the signal light beam L12. After that, the signal light beam L12 is collected at the signal light beam input end of the MMI element 32a by the lens system 38. Note that the lens system 38 is configured of two condensing lenses 38a and 38b arranged side by side in the optical axis direction.

The half wave plate 29, the total reflection mirror 30a, and the lens system 36 are disposed on the optical path between the PBS 26 and the signal light beam input end of the MMI element 32b. The signal light beam L13 having the Y-polarized component reflected off (divided at) the PBS 26 is again reflected off the total reflection mirror 30a, and its optical axis is matched with the optical axis of the signal light beam input end of the MMI element 32b. After that, the signal light beam L13 is transmitted through the half wave plate 29 disposed between the total reflection mirror 30a and the MMI element 32b. The half wave plate 29 can be configured of a birefringence material in a flat shape having a light incident surface and a light emitting surface opposite to each other. The birefringence material is quartz crystal, for example. The half wave plate 29 imparts a 180-degree phase difference to two polarized components by the action of the birefringence material to rotate the polarization direction of the signal light beam L13 at an angle of 90°. Therefore, the polarization direction of the signal light beam L13 transmitted through the half wave plate 29 is matched with the polarization direction of the signal light beam L12 having travelled through the PBS 26 in a straight line. After that, the signal light beam L13 is collected at the other signal light beam input end of the MMI element 32b by the lens system 36. The lens system 36 is configured of two condensing lenses 36a and 36b arranged in the optical axis direction. Note that the half wave plate 29 may be disposed at any place on the optical path of the signal light beam L13, and may be disposed between the PBS 26 and the total reflection mirror 30a, for example.

The coherent receiver 1A further includes, as optical components that optically couple the local light beam input ends of these two MMI elements 32a and 32b to the local light beam input port 13, a skew adjustment element 27b, a total reflection mirror 30b, a polarizer 33, a BS 34, and lens systems (condensing components) 28 and 31. These optical components are all housed in the inside of the housing 2.

The polarizer 33 determines the polarization direction of the local light beam L2 inputted from the local light beam input port 13. Thus, even though the polarization direction of the local light beam that has to be maintained by the PMF coupled to the input port 13 is displaced in the assembly of the housing 2, the local light beam L2 having a linearly polarized component alone in the polarization direction at an angle of 0° or 90° can be obtained. Note that in the case in which a light source for the local light beam L2 is a semiconductor LD, typically, the light beams is an elliptically polarized light beam dominantly having the polarization of a component in parallel with the active layer. However, in order to obtain the oscillation stability, material reliability, and desired output wavelengths, for example, the semiconductor LD, an active layer having lattice unmatching may be adopted. In a laser light beam outputted from such an active layer having lattice unmatching, the minor axis of the elliptically polarized light beam is sometimes relatively increased. Even in the case like this, the polarizer 33 converts the local light beam L2 from an elliptically polarized light beam into a linearly polarized light beam.

The BS 34 is a member in a flat shape having a light incident surface (an optical surface) optically coupled to the local light beam input port 13 through the polarizer 33, and divides the local light beam L2 passed through the polarizer 33 into two local light beams L22 and L23 at a ratio of division of 50%. The local light beam L22 that is one divided part of the local light beam L2 is reflected off the BS 34, and travels to the total reflection mirror 30b in a straight line. The local light beam L23 that is another divided part of the local light beam L2 is transmitted through the BS 34. The optical axis of the local light beam L22 and the optical axis of the local light beam L23 form a nearly right angle.

The total reflection mirror 30b and the lens system 28 are disposed on the optical path between the BS 34 and the local light beam input end of the MMI element 32a. The local light beam L22 reflected off (divided at) the BS 34 is again reflected off the total reflection mirror 30b, and its optical axis is matched with the optical axis of the local light beam input end of the MMI element 32a. After that, the local light beam L22 is collected at the local light beam input end of the MMI element 32a by the lens system 28. The lens system 28 is configured of two condensing lenses 28a and 28b arranged in the optical axis direction.

The skew adjustment element 27b and the lens system 31 are disposed on the optical path between the BS 34 and the local light beam input end of the MMI element 32b. The local light beam L23 having travelled through the BS 34 in a straight line is passed through the skew adjustment element 27b. The skew adjustment element 27b compensates a delay due to the difference in the optical path length of the local light beam L22 to the local light beam L23 by equivalently increasing the optical path length of the local light beam L23 from the BS 34 to the local light beam input end of the MMI element 32b. That is, the local light beam L22 has a distance to the MMI element longer than the local light beam L23 by a distance from the BS 34 to the total reflection mirror 30b. The skew adjustment element 27b imparts the phase delay corresponding to the distance to the local light beam L23. After that, the local light beam L23 is collected at the local light beam input end of the MMI element 32b by the lens system 31. Note that the lens system 31 is configured of two condensing lenses 31a and 31b arranged in the optical axis direction.

As described above, the signal light beam L1 and the local light beam L2 inputted to the coherent receiver 1A are directed to two MMI elements 32a and 32b. The MMI elements 32a and 32b are signal receiving units according to the embodiment, and are photodiode (PD) integrated interference waveguide elements using an indium phosphide (InP) semiconductor substrate, for example. The MMI element 32a causes interference between the one polarized component (the signal light beam L12) and the local light beam L22 to extract, from the signal light beam L12, a signal component the same as the phase of the local light beam L22 and a signal component different from the phase of the local light beam L22 at an angle of 90°, and generates a photocurrent which is a first reception signal that is electrical. Similarly, the MMI element 32b causes interference between the other polarized component (the signal light beam L13) and the local light beam L23 to extract, from the signal light beam L13, a signal component the same as the phase of the local light beam L23 and a signal component different from the phase of the local light beam L23 at an angle of 90°, and generates a photocurrent which is a second reception signal that is electrical. The photocurrents generated by the MMI elements 32a and 32b are converted into voltage signals by amplifiers 39a and 39b installed in the inside of the housing 2 (see FIG. 1), and outputted from the plurality of terminals 3. The amplifiers 39a and 39b are mounted on a circuit board 20e surrounding these two MMI elements 32a and 32b. The amplifiers 39a and 39b are trans-impedance amplifiers (TIAs), for example.

Here, in the plurality of optical components disposed on the optical path between the signal light beam input port 11 and the MMI elements 32a and 32b, the optical properties of the BS 22, the PBS 26, and the half wave plate 29 will be described. As described above, the BS 22 and the PBS 26 have a dielectric multi-layer film filter. The optical properties (the ratio of division) of the BS 22 and the PBS 26 depend on the wavelength of the incident light beam and the film thickness of the dielectric multi-layer film filter. Therefore, in order to obtain desired optical properties, the film thicknesses of the dielectric multi-layer film filters of the BS 22 and the PBS 26 are set to appropriate values corresponding to the wave range to be used. In the case in which the wave range of the signal light beam L1 according to the embodiment is the L-band (1,565 nm to 1,615 nm, the first wave range according to the embodiment), for example, the designed wave ranges of the BS 22 and the PBS 26 include the L-band. That is, the film thicknesses of the dielectric multi-layer film filters of the BS 22 and the PBS 26 are set such that desired optical properties are obtained at least in the L-band. Specifically, the film thickness of the dielectric multi-layer film filter of the BS 22 is selected such that the ratio of division of the BS 22 is a desired value that is 10% or less (e.g. 5%) in the entire range of the L-band. The film thickness of the dielectric multi-layer film filter of the PBS 26 is selected such that the ratio of division of the PBS 26 is a desired value (approximately 50%) in the entire range of the L-band.

Figure 3:
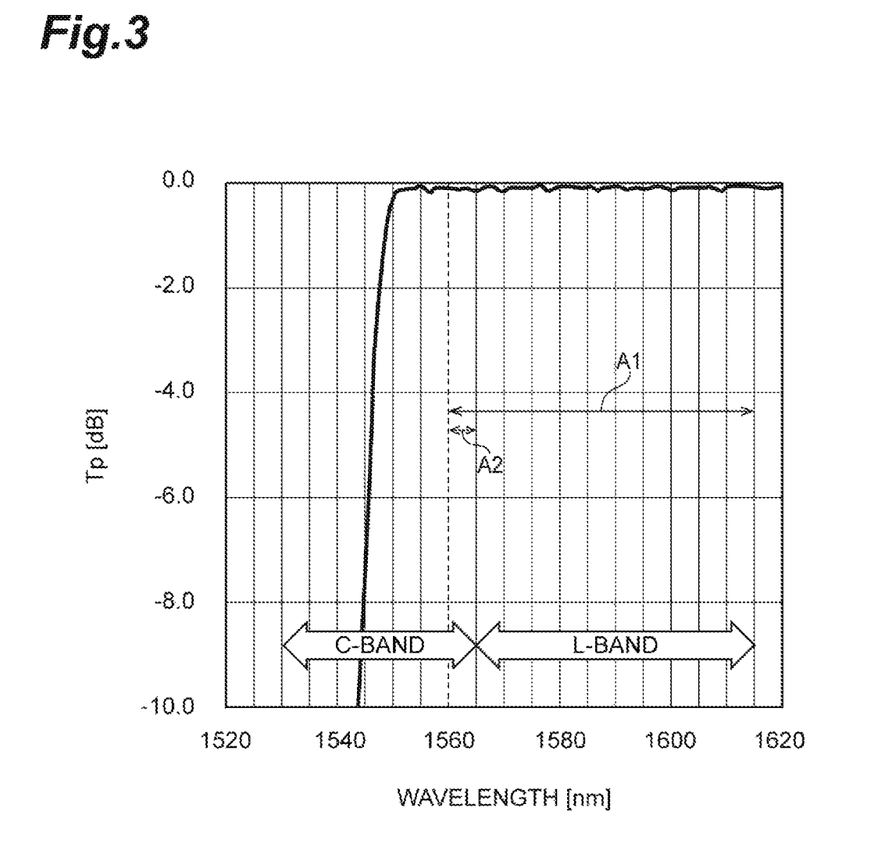
FIG. 3 is a graph that actually measured the relationship between a P-polarized light transmittance of a PBS and the wavelength of an incident light beam as an example.

FIG. 3 is a graph that actually measured the relationship between the P-polarized light transmittance (Tp) of the PBS 26 and the wavelength of an incident light beam as an example. The horizontal axis expresses the wavelength of an incident light beam (unit: nm), and the vertical axis expresses a P-polarized light transmittance (dB). FIG. 3 shows a designed wave range A1 of the PBS 26. As shown in FIG. 3, the P-polarized light transmittance of the PBS 26 according to the embodiment suddenly rises from the wave range less than 1,550 nm to 1,550 nm, and becomes almost constant at around 0 dB (zero decibel) in the wave range of 1,550 nm to 1,555 nm and above. According to the PBS 26 having such optical properties, a ratio of division of approximately 50% can be achieved in the entire range of the L-band.

In addition to this, in the embodiment, the designed wave range A1 of the PBS 26 includes a partial wave range A2 in the C-band adjacent to the L-band (e.g. 1,560 nm to 1,565 nm, a second wave range according to the embodiment). Therefore, the designed wave range of the PBS 26 according to the embodiment ranges from 1,560 nm to 1,615 nm Note that a specific range of the wave range A2 included in the designed wave range of the PBS 26 out of the L-band is not limited to this. For example, when the designed wave range of the PBS 26 includes any wave range smaller than 1,565 nm, such as a wave range of 1,555 nm to 1,565 nm or 1,550 nm to 1,565 nm, for example, the width may be increased or decreased, as necessary.

The designed wave range of the BS 22 is also set based on the concept similar to the concept above. That is, the designed wave range of the BS 22 includes the partial wave range in the C-band adjacent to the L-band (e.g. 1,560 nm to 1,565 nm). Therefore, the designed wave range of the BS 22 according to the embodiment ranges from 1,560 nm to 1,615 nm similarly to the PBS 26. Note that a specific range of the wave range included in the designed wave range of the BS 22 out of the L-band is not limited to this. For example, when the designed wave range of the BS 22 includes any wave range smaller than 1,565 nm, such as a wave range of 1,555 nm to 1,565 nm or 1,550 nm to 1,565 nm, for example, the width may be increased or decreased, as necessary.

As described above, the half wave plate 29 has a birefringence material in a plate shape. The optical properties of the half wave plate 29 (phase differences imparted to two polarized components) depend on the wavelength of the incident light beam and the plate thickness of the birefringence material. Therefore, in order to obtain desired optical properties, the plate thickness of the birefringence material of the half wave plate 29 is set to appropriate values corresponding to the wave range to be used. In the case in which the wave range of the signal light beam L1 according to the embodiment is the L-band, for example, the designed wave range of the half wave plate 29 includes the L-band. That is, the plate thickness of the birefringence material of the half wave plate 29 is set such that desired optical properties are obtained at least in the L-band. Specifically, the plate thickness of the birefringence material of the half wave plate 29 is selected such that the phase difference of the half wave plate 29 falls in a range of 180±5° in the entire range of the L-band.

Note that on the outer faces of the BS 22, the PBS 26, and the half wave plate 29 in the wave range A1 that is the designed wave range, markings are provided in order to distinguish from the BS, the PBS, and the half wave plate in the C-band that is the designed wave range. An example of the marking includes a step cut by a dicing blade, for example.

Figure 4:
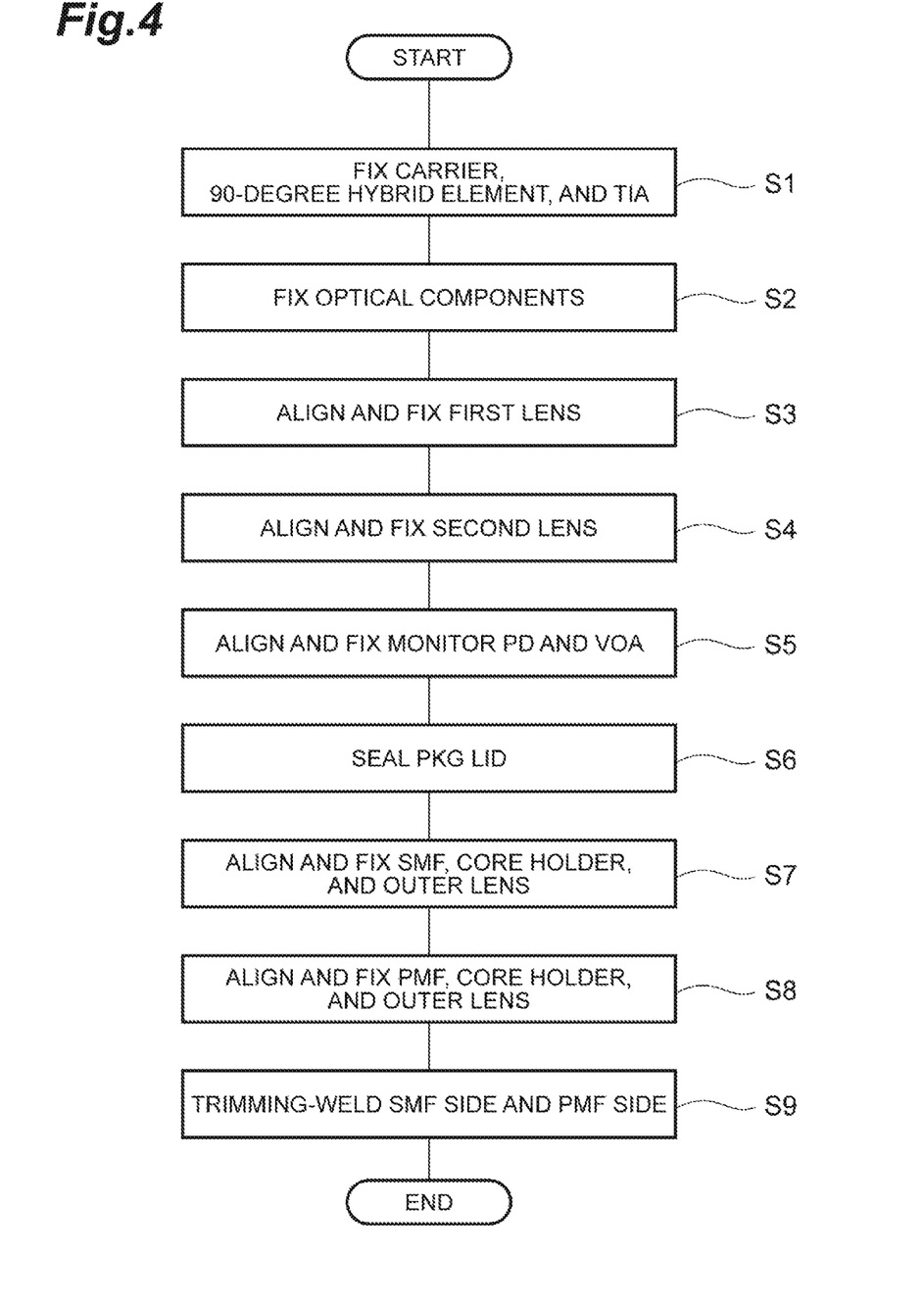
FIG. 4 is a flowchart showing an assembly method for a coherent receiver.

Here, an assembly method for the coherent receiver 1A will be described. FIG. 4 is a flowchart showing the assembly method for the coherent receiver 1A. As shown in FIG. 4, first, in Step S1, the MMI element 32a and the MMI element 32b are fixed on the carrier 20d using AuSn solder, for example. The amplifiers 39a and 39b are fixed on the carrier 20d using resin materials, such as solder and an Ag paste whose melting point is lower than the melting point of AnSn solder. After that, the carrier 20d is installed on the bottom face of the housing 2, and fixed using an adhesive, such as a UV resin.

Subsequently, in Step S2, the optical components are fixed on the bottom face of the housing 2. In detail, first, the PBS 26, the total reflection mirrors 30a and 30b, and the BS 34 are disposed on the carrier 20d, and fixed using an adhesive. At this time, these optical components are gripped above the housing 2, the light beam of an autocollimator is reflected off the light incident surfaces, and the angles of these optical components are adjusted such that the optical axes of reflected light beams are matched with each other while the reflected light beams are observed by the autocollimator. These optical components are disposed at predetermined positions on the carrier 20d with the angles maintained. Note that the positions of these optical components on the carrier 20d are determined with visual observations alone to alignment marks formed in advance on the carrier 20d. The work is in turn performed on all the PBS 26, the total reflection mirrors 30a and 30b, and the BS 34.

Subsequently, the BS 22 is disposed on the carrier 20*a* in the inside of the housing 2, and fixed using an adhesive. In this step, similarly to the previous step, the angle of the BS 22 is adjusted using the autocollimator, and the BS 22 is disposed at a predetermined position on the carrier 20*a* with the angle maintained.

Subsequently, the skew adjustment element 27*a* and 27*b*, the half wave plate 29, and the polarizer 33 are disposed on the carrier 20*d* in the inside of the housing 2, and fixed using an adhesive. In this step, similarly to the previous step, the angles of these optical components are adjusted using the autocollimator, and the optical components are disposed at predetermined positions on the carrier 20*d* with the angles maintained. This work is in turn performed on all the skew adjustment element 27*a* and 27*b*, the half wave plate 29, and the polarizer 33.

Subsequently, in Step S3, based on the light intensity of the test light beam inputted to the MMI elements 32*a* and 32*b*, the optical axis of at least one optical component is adjusted except the BS 22, the PBS 26, and the half wave plate 29. In this step, the optical axes of the condensing lenses 28*a*, 31*a*, 36*a*, and 38*a* are adjusted, and the condensing lenses 28*a*, 31*a*, 36*a*, and 38*a* are fixed. For the preparation, first, the output wavelength of a test light source used for the optical axis adjustment is set to a wavelength included in the partial wave range A2 in the C-band adjacent to the L-band (see FIG. 3). As an example, the wave range A2 ranges from 1,550 nm to 1,565 nm. As an example, the output wavelength of the test light source is 1,560 nm Two simulation ports are disposed on the one end face 2*b* of the housing 2. These simulation ports are replacements of the input ports 11 and 13, and the simulation ports emit test light beams from the test light source toward the inside of the housing 2. The simulation ports have collimating lenses installed in the inside of the simulation ports, and these test light beams are substantially collimated light beams.

Subsequently, the optical axes of these simulation ports are adjusted. First, the test light beam is introduced into the inside of the housing 2 from one of the simulation ports, and the test light beam is inputted to the optical components including the BS 22, the PBS 26, and the half wave plate 29. The test light beam passed through the optical components is detected by a PD built in the MMI element 32*a*. In this state, the simulation port is slid on the one end face 2*b* of the housing 2, and the position of the simulation port at which the test light beam intensity is the maximum is searched. Similarly, the test light beam is introduced into the inside of the housing 2 from the other of the simulation ports through the simulation port, and the test light beam passed through the optical components is detected by a PD built in the MMI element 32*b*. The simulation port is slid on the one end face 2*b*, and the position of the simulation port detected through the PD at which the test light beam intensity is the maximum is searched. The effective areas of the signal light beam input port and the local light beam input port of the MMI elements 32*a* and 32*b* are very small as about a few μm. However, the test light beam is converted into the collimated light beam, and hence even in the case in which optical coupling is achieved not through the lens systems 28, 31, 36, and 38, the position of the simulation port at which the maximum optical coupling is imparted can be determined.

Subsequently, the optical axes of the condensing lenses 28*a*, 31*a*, 36*a*, and 38*a* are adjusted, and the condensing lenses 28*a*, 31*a*, 36*a*, and 38*a* are fixed. First, the condensing lens 28*a* is disposed on the carrier 20*d*, the test light beams from the simulation ports are entered, the test light beams passed through the condensing lens 28*a* are detected by the built-in PD of the MMI element 32*a*. The position and angle of the condensing lens 28*a* at which the received light beam intensity at the built-in PD is the maximum are determined while the position and angle of the condensing lens 28*a* are slightly changed. After the determination, the condensing lens 28*a* is moved to the MMI element 32*a* side by a predetermined amount, and then retracted upward, and an adhesive resin (e.g. a UV curable resin) is coated on the lens installation face of the carrier 20*d*. The condensing lens 28*a* is returned to the original position, the position of the condensing lens 28*a* is adjusted such that the received light beam intensity at the built-in PD is the intensity before the condensing lens 28*a* is retracted, UV rays are applied, and then the condensing lens 28*a* is temporarily fixed on the carrier 20*d*. The condensing lenses 31*a*, 36*a*, and 38*a* are also temporarily fixed on the carrier 20*d* similarly to the condensing lens 28*a*. After that, the adhesive resin is heated to permanently fix the condensing lenses 28*a*, 31*a*, 36*a*, and 38*a*.

Subsequently, in Step S4, the above-described test light beam using as it is, the optical axes of the condensing lenses 28*b*, 31*b*, 36*b*, and 38*b* are adjusted, and the condensing lenses 28*b*, 31*b*, 36*b*, and 38*b* are fixed. A method of adjusting the optical axes and fixing the optical components is similar to the method of adjusting the optical axes of the above-described condensing lenses 28*a*, 31*a*, 36*a*, and 38*a* and fixing these components.

Subsequently, in Step S5, based on the light intensity of the test light beam inputted to the MMI elements 32*a* and 32*b*, the optical axis of at least one optical component is adjusted except the BS 22, the PBS 26, and the half wave plate 29. In this step, the optical axes of the monitor PD 24 and the VOA 23 are adjusted, and the monitor PD 24 and the VOA 23 are fixed. First, on the outside of the housing 2, the monitor PD 24 is installed on the PD carrier 24*a* to assemble an intermediate assembly in advance, and the intermediate assembly is installed on the carrier 20*a*. Subsequently, the test light beam from the simulation port is entered to the monitor PD 24, and the intensity of the test light beam entered to the monitor PD 24 is detected. The position and angle of the PD carrier 24*a* at which the received light beam intensity at the monitor PD 24 is the maximum are determined while the position and angle of the PD carrier 24*a* are slightly changed. After the determination, the PD carrier 24*a* is retracted upward, and an adhesive resin (e.g. a UV curable resin) is coated on the PD carrier installation face of the carrier 20*a*. The PD carrier 24*a* is returned to the original position, the position of the PD carrier 24*a* is adjusted such that the received light beam intensity at the monitor PD 24 is the intensity before the PD carrier 24*a* is retracted, UV rays are applied, and then the PD carrier 24*a* is temporarily fixed on the carrier 20*a*.

Subsequently, the VOA 23 is fixed on the VOA the carrier 20*b*. At this time, in order to obtain the maximum extinction ratio to the application voltage, the test light beam is inputted from the simulation port while a control signal is applied from a bias power supply to the VOA 23 through a collet that grips the VOA 23, the intensity of the test light beam passed through the VOA 23 is detected by the PD built in the MMI element 32*a*, and the optical axis is adjusted while the extinction ratio is confirmed. After that, the VOA 23 is retracted upward, and an adhesive resin (e.g. a UV curable resin) is coated on the VOA installation face of the carrier 20*b*. The VOA 23 is returned to the original position, the position of the VOA 23 is adjusted such that the extinction ratio of the VOA 23 is the extinction ratio before the VOA 23 is retracted, UV rays are applied, and then the VOA 23 is temporarily fixed on the carrier 20b. After that, the adhesive resin is heated to permanently fix the PD carrier 24a and the VOA 23.

Subsequently, in Step S6, a cover (a lid) that covers the housing 2 is fixed to the housing 2 by welding while the inside of the housing 2 is substituted with dry nitrogen. Note that on the inner surface of the cover, black plating is applied in order to avoid stray light.

Subsequently, in Step S7, the one simulation port is replaced with the original signal light beam input port 11, the optical axis of the signal light beam input port 11 is adjusted, and the signal light beam input port 11 is fixed. Specifically, the test light beam is introduced from the signal light beam input port 11, and the intensity of the test light beam is detected by the built-in PD of the MMI element 32a. The position is determined at which the received light beam intensity at the built-in PD is the similar intensity when the optical axis of the lens system is adjusted using the simulation port while both of the lens holder 11b and the sleeve 11a of the signal light beam input port 11 are slid in a plan along the end face 2b with reference to the detected intensity of the test light beam. It may be finer that this position is the position at which the extinction ratio of the VOA 23 is the similar extinction ratio when the optical axis of the VOA 23 is adjusted. After the determination, the lens holder 11b is fixed to the housing 2 by YAG welding, for example. The core holder 11c is disposed between the lens holder 11b and the sleeve 11a, and the triaxial optical axis of the sleeve 11a is adjusted. The core holder 11c is fixed to the sleeve 11a by YAG welding at the position at which the received light beam intensity at the built-in PD is the maximum.

Subsequently, in Step S8, the other simulation port is replaced with the original local light beam input port 13, the optical axis of the local light beam input port 13 is adjusted, and the local light beam input port 13 is fixed. Specifically, the test light beam is introduced from the local light beam input port 13, and the intensity of the test light beam is detected by the built-in PD of the MMI element 32b. The position is determined at which the received light beam intensity at the built-in PD is the similar intensity when the optical axis of the lens system is adjusted using the simulation port while both of the lens holder 13b and the sleeve 13a of the local light beam input port 13 are slid in a plan along the end face 2b with reference to the detected intensity of the test light beam. After the determination, the lens holder 13b is fixed to the housing 2 by YAG welding, for example. The core holder 13c is disposed between the lens holder 13b and the sleeve 13a, and the triaxial optical axis of the sleeve 13a is adjusted. The core holder 13c and the sleeve 13a are fixed by YAG welding at the position at which the received light beam intensity at the built-in PD is the maximum.

Subsequently, in Step S9, in order to finely tune the optical axis of the sleeve 11a, a YAG light beam at a weak intensity is applied to the core holder 11c to bring the received light beam intensity at the built-in PD of the MMI element 32a and the extinction ratio of the VOA 23 to the optimum. Similarly, in order to finely tune the optical axis of the sleeve 13a, a YAG light beam at a weak intensity is applied to the core holder 13c to bring the received light beam intensity at the built-in PD of the MMI element 32b to the optimum.

Note that the wavelength of the test light beam used in Steps S4 to S9 is included in the partial wave range A2 in the C-band adjacent to the L-band (see FIG. 3) similarly to the test light beam used in Step S3. As an example, the wave range A2 ranges from 1,550 nm to 1,565 nm. As an example, the wavelength of the test light beam is 1,560 nm.

The effect obtained from the assembly method for the coherent receiver 1A according to the embodiment described above will be described. Typically, in the assembly of a coherent receiver, the optical axes of various optical components are adjusted using a test light beam. At this time, the wavelength of the test light beam used is desirably included in the designed wave range of the optical component in order to highly accurately perform optical axis adjustment. Presently, the C-band is mainly used in coherent optical communications. However, it is studied that the wave range is extended to the L-band in association with an increase in communication volumes. The development of coherent receivers meeting the L-band is advancing. In the coherent receivers meeting the L-band, the designed wave range of the optical component is the L-band. In the optical components, the BS 22, the PBS 26, and the half wave plate 29, for example, are difficult to meet both of the C-band and the L-band, and need exclusive design for each band.

However, in existing testing devices, the wavelength of the test light beam is included in the C-band. Therefore, in the case in which a test light beam for the L-band is used for the assembly of a coherent receiver for the L-band, the wavelength tunable range of the light source of a testing device has to be extended (or the light source has to be replaced suitable for a coherent receiver to be assembled), resulting in an increase in the cost of the testing device. Specifically, wavelength tunable light sources that can cover the wavelength range from the C-band (1,530 to 1,565 nm) to the L-band (1,565 nm to 1,615 nm) are very expensive. The assembly work of the coherent receiver is complicated, and the number of processes is increased. Alternatively, it is thought that the production line of the coherent receiver is divided into lines for the C-band and the L-band. However, this leads to upsizing production facilities, which is unfavorable.

To the problems above, in the assembly method according to the embodiment, the designed wave range A1 of the BS 22, the PBS 26, and the half wave plate 29 (see FIG. 3) includes the L-band that is the wave range of the signal light beam L1 as well as the wave range A2 that is a part of the C-band (see FIG. 3). Thus, it is made possible to set the wavelength of the test light beam in the wave range A2 out of the wave range of the signal light beam L1. In the embodiment, after the BS 22, the PBS 26, and the half wave plate 29 are disposed, the optical axes of the other optical components (the lens systems 28, 31, 36, and 38 and any other component) are adjusted using the test light beam included in the wave range A2. Therefore, according to the embodiment, even in the case in which the wave range is extended from the C-band to the L-band, the optical axis of the optical component of the coherent receiver for the C-band and the optical axis of the optical component of the coherent receiver for the L-band can be adjusted using the test light beam at a common wavelength. Alternatively, the wavelength tunable range of the test light source can be narrowed (e.g. the range can be limited to the C-band). Accordingly, according to the assembly method of the embodiment, an increase in the cost of a testing device and the complication of the assembly work can be reduced. Note that the other optical components (e.g. the skew adjustment elements 27a and 27b, the polarizer 33, the BS 34, and any other component) except the BS 22, the PBS 26, and the half wave plate 29 may be designed such that these components meet both of the C-band and the L-band.

As in the embodiment, the wave range A2 may include a wave range smaller than 1,565 nm that is the lower limit of the L-band. Thus, even in the case of the combined use of the L-band and the C-band in communication systems, the optical axis of the optical component of the coherent receiver 1A for the L-band can be highly accurately adjusted using the test light beam included in the C-band. In this case, the wavelength of the test light beam may be in the range of 1,550 nm to 1,565 nm. As described above, the wavelength of the test light beam is set to the partial wave range close to the L-band in the C-band, and hence the over extension of the designed wave range of the BS 22, the PBS 26, and the half wave plate 29 can be reduced.

As in the embodiment, the optical components mounted after the installation of the BS 22, the PBS 26, and the half wave plate 29 may include the lens systems 28, 31, 36, and 38. Thus, the optical axes of the lens systems 28, 31, 36, and 38 can be highly accurately adjusted. As in the embodiment, the optical components mounted after the installation of the BS 22, the PBS 26, and the half wave plate 29 may include the VOA 23. Thus, the attenuation ratio of the VOA 23 can be highly accurately adjusted.

The assembly method for a coherent receiver according to the present application is not limited to the foregoing embodiment, and can be variously modified. For example, in the foregoing embodiment, the BS 22, the PBS 26, and the half wave plate 29 are described as examples of the optical components having the designed wave range that is the wave range A1 shown in FIG. 3. However, the optical components including the first wave range that is the wave range of the signal light beam L1 and the second wave range that is out of the first wave range in the designed wave range may be at least one of the optical components or an optical component other than the optical components. In the foregoing embodiment, the L-band is described as an example of the wave range of the signal light beam L1. However, the wave range of the signal light beam L1 may be a band other than the L-band.

What is claimed is:

1. A coherent receiver that extracts phase information contained in signal light that has two polarization components by interfering between the signal light and local light, the coherent receiver comprising:
   a signal port receiving the signal light that has two polarization components at right angles each other;
   a polarization dependent beam splitter (PBS) that splits the signal light into two portions depending on the polarizations contained in the signal light;
   a beam splitter (BS) that splits the local light into two portions;
   a multi-mode interference (MMI) device that interferes between one of the two portions of the signal light and one of the two portions of the local light;
   optical components provided between the PBS and the MMI device; and
   wherein the PBS splitting a first wavelength range of the signal light and a second wavelength range outside the first wavelength range,
   wherein a shortest wavelength of the first wavelength range is 1,565 nm, and
   the second wavelength range includes the wavelength that is shorter than 1,565 nm.

2. The coherent receiver of claim 1,
   wherein a longest wavelength of the first wavelength range is 1,615 nm.

3. The coherent receiver of claim 2,
   wherein at least of the optical components is a lens to condense the signal light in the MMI device.

4. The coherent receiver of claim 1,
   wherein the signal port output the signal light to the PBS;
   further comprising an optical attenuator provided between the PBS and the signal port.

5. A method of assembling an optical module that provides a housing, an input port, and an optical component, the housing having one side and another side, the input port receiving a signal light that has two polarization components at right angles each other, a polarization dependent beam splitter (PBS) that splits the signal light into two portions depending on the polarizations contained in the signal light, a beam splitter (BS) that splits the local light into two portions, a multi-mode interference (MMI) device that interferes between one of the two portions of the signal light and one of the two portions of the local light, optical components provided between the PBS and the MMI device, the method comprising steps of:
   placing a tool on a rotation stage with a reference wall, the tool having a pair of sides extending in parallel to each other and a reference side making the angle θ against one of the sides, the tool in one of the paired side being abutted against the reference wall of the rotation stage;
   arranging the PBS between the signal port and the MMI device;
   arranging at least of the components between the PBS and the MMI device;
   inputting a test light of a second wavelength range outside a first wavelength range of the signal light to the input port; and
   adjusting at least of the components to become the maximum which a magnitude of the test light received by MIMI device,
   wherein a shortest wavelength of the first wavelength range is 1,565 nm, and
   the second wavelength range includes the wavelength that is shorter than 1,565 nm.

6. The method of claim 5,
   wherein a longest wavelength of the first wavelength range is 1,615 nm.

7. The method of claim 6,
   wherein at least of the optical components is a lens to condense the signal light in the MMI device.

8. The method of claim 5,
   wherein the signal port output the signal light to the PBS;
   furthering an optical attenuator provided between the PBS and the signal port.

* * * * *